Dec. 28, 1937.  L. L. SALFISBERG  2,103,386
COLOR PACKAGING
Filed May 24, 1935  3 Sheets-Sheet 2
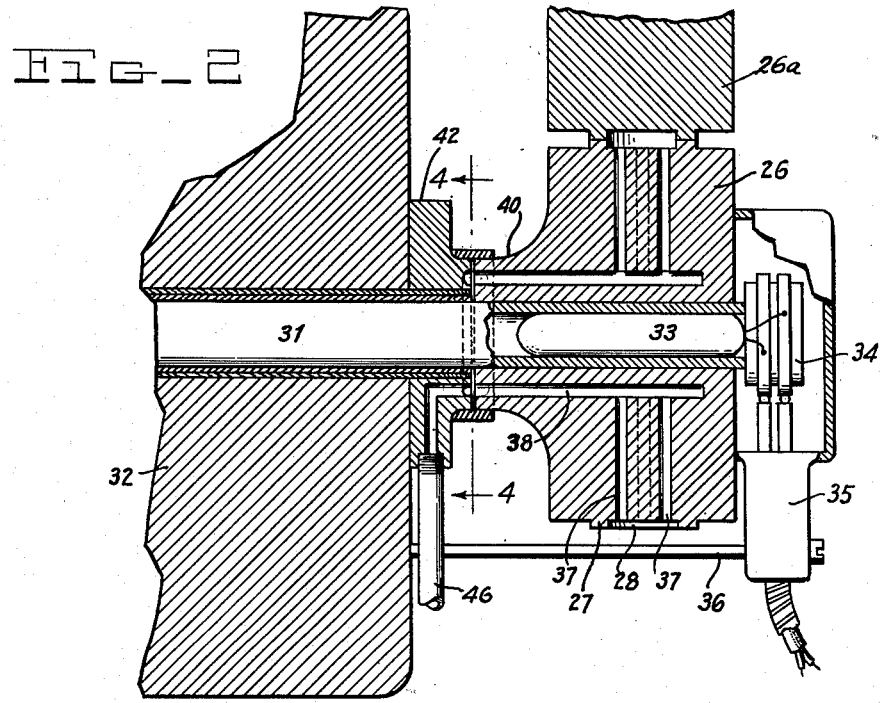
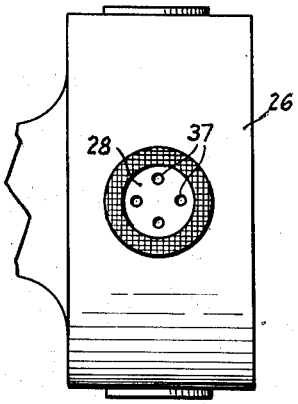
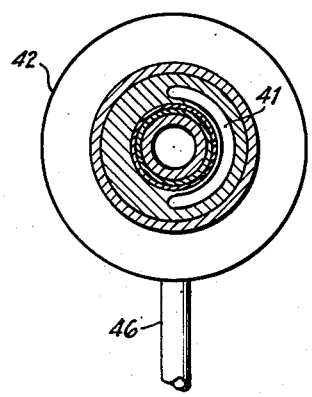
INVENTOR.
Leroy L. Salfisberg
BY Gordon B Scheiter
ATTORNEY.

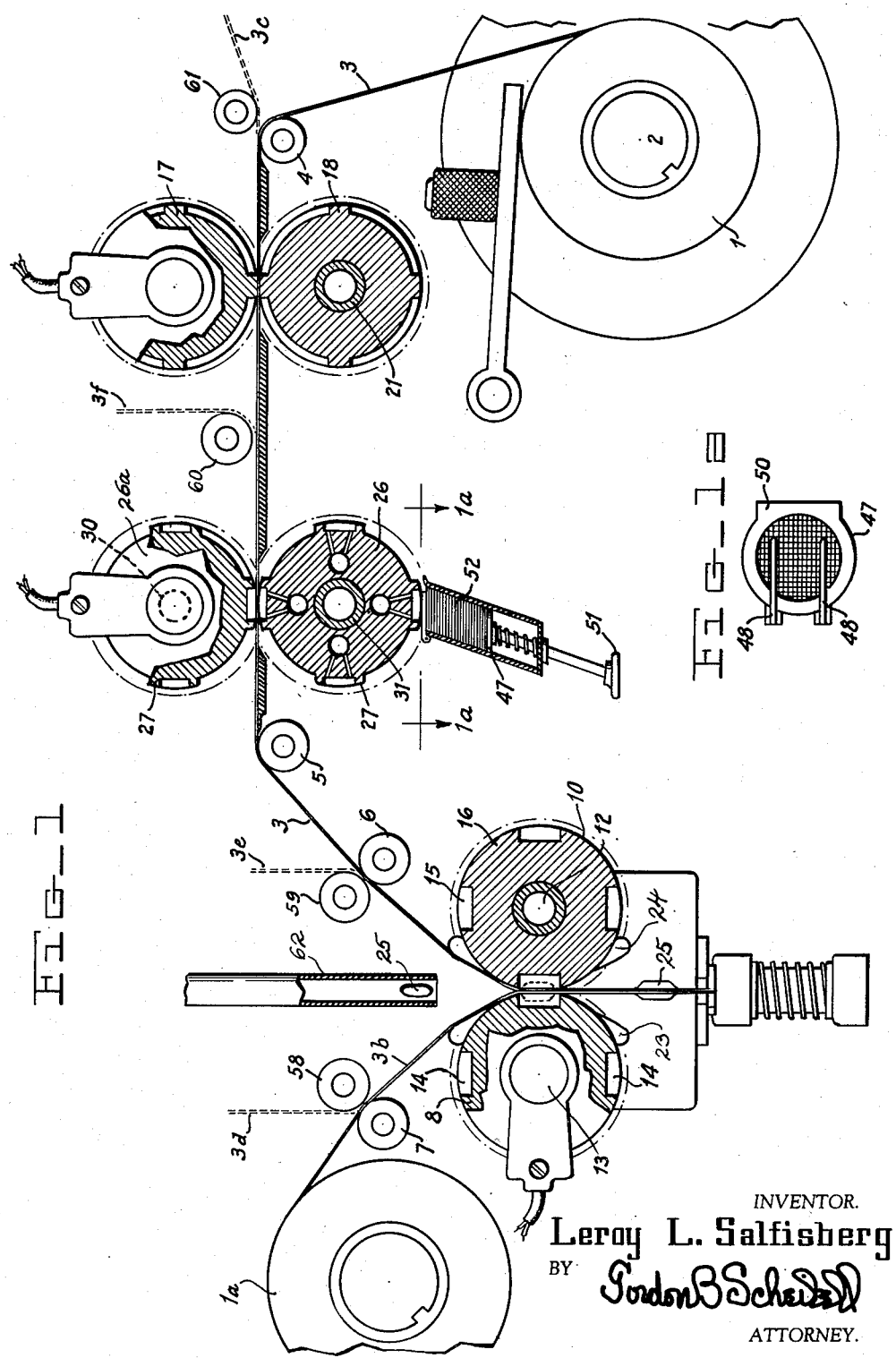

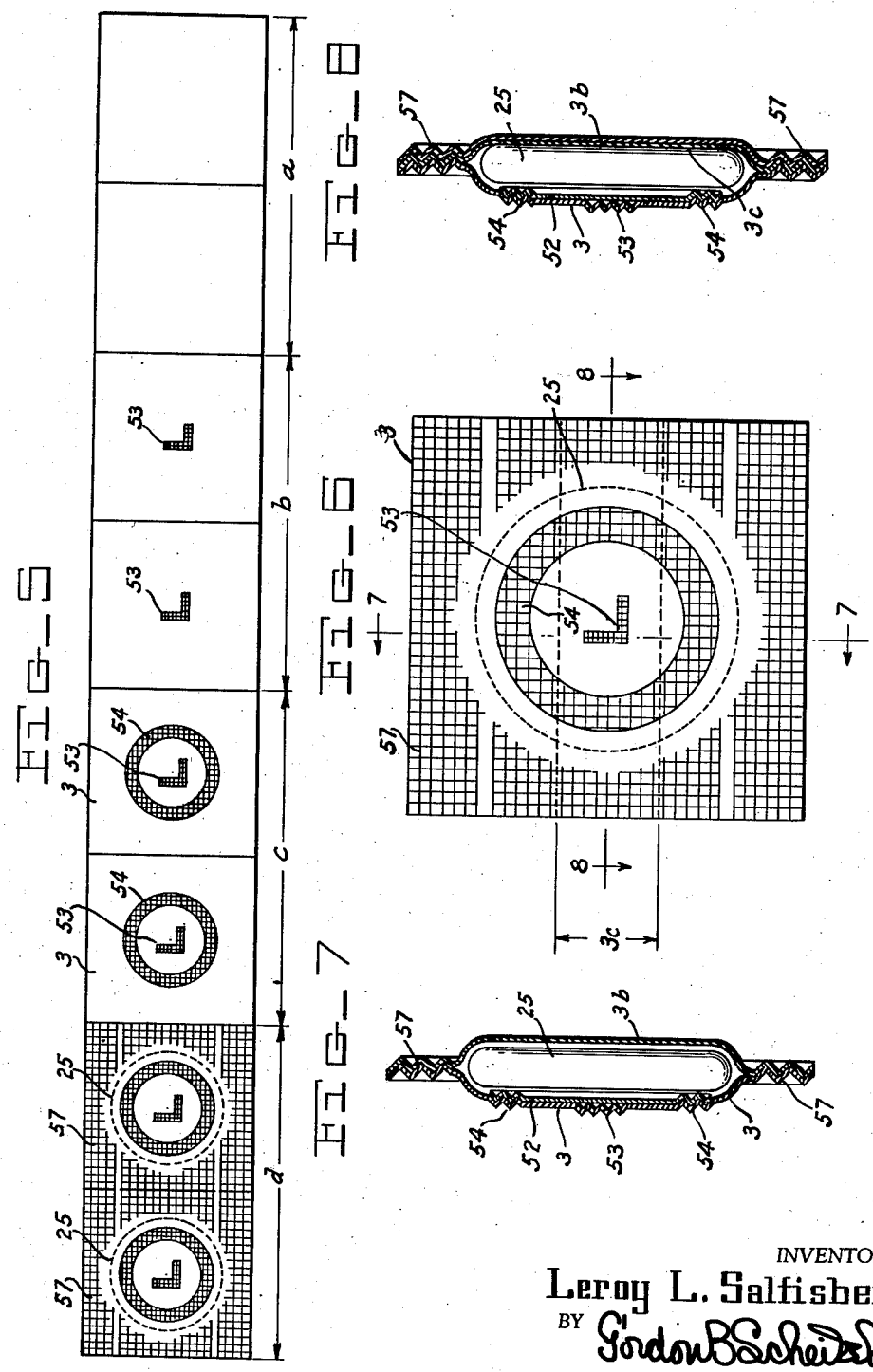

Patented Dec. 28, 1937

2,103,386

UNITED STATES PATENT OFFICE 2,103,386

COLOR PACKAGING

Leroy L. Salfisberg, South Orange, N. J., assignor to Ivers-Lee Company, Newark, N. J., a corporation of Delaware Application May 24, 1935, Serial No. 23,330

3 Claims. (Cl. 206—46)

This invention pertains in general to packaging means and specifically relates to an arrangement providing color and other effects in the packaging of commodities.

One of the objects of this invention consists in the provision of a composite form of package to give artistic and colorful effects to such commodity package.

Another object comprises providing a mechanical system for utilizing an oxidation process to form sealing areas for packages and means for inserting and sealing materials of various composition and colors in said package to provide color and indicia effects.

Another object of this invention comprises providing a package forming indicia marking and colored material incorporating machine comprising, means for supplying and feeding opposed layers of packaging material with additional color material inserts and package forming means for joining said layers and inserts in bonding areas to produce commodity enclosures with color effects.

Another object of the invention consists in providing a method for producing color effects in a package of regenerated cellulose material which comprises combining an insert of colored material of predetermined shape and size with a strip of packaging material, after the strip has passed through indicia forming rollers, feeding the strip to a second set of heated crimping rollers having complementary bonding areas of predetermined configuration, forming a bond between the color and indicia marked strip and another strip of cellulose material by an oxidization process.

Another object of the invention comprises providing a mechanical structure having means for feeding separate pieces of color material to crimping rollers and utilizing a vacuum or suction system contained within the said crimping rollers to combine the color inserts with strip packaging material by a crimping and oxidization process.

These and other objects will be apparent from the following, reference being had to the accompanying drawings in which like reference numerals designate corresponding parts and in which:

Fig. 1 is a representation of one embodiment of a mechanical system according to the present invention;

Fig. 1a is a top view of an insert reservoir used in accordance with the invention;

Fig. 2 is a sectional view of a mechanical arrangement employed for providing color effects in a packaging process;

Fig. 3 is a front view of a roller shown in the representation of Fig. 2;

Fig. 4 is a cross-sectional view taken along the line 4—4 of Fig. 2 showing the air suction channel;

Fig. 5 is a representation of a strip of packaging material as used in the mechanical arrangement of Fig. 1, showing successive steps of the fabrication process;

Fig. 6 is a view of a package unit constructed in accordance with the invention bearing indicia markings;

Fig. 7 is a cross-sectional view of the package unit of Fig. 6; and

Fig. 8 is similar to Fig. 7 but employing two colored packaging material insertions, one on each side of the package.

The invention contemplates the preferable use of transparent regenerated cellulose material of ribbon formation fed through a plurality of rollers for operating on the material in a plurality of oxidization treatments under pressure to produce a composite package. According to one embodiment of the invention, cellulose material is subjected to an oxidization marking step for producing various indicia on the material. This indicia may be in the form of advertising, serial numbers, letters, special trade-mark designs or other configurations. In another step, the material thus provided with indicia markings is combined with a color strip and is formed to enclose the article with a seal, the seal being produced by further oxidization of the material. The package produced according to this invention utilizes a regenerated cellulose material of a normally tough and wiry nature to produce article enclosing envelopes of a resilient nature resistive to tearing and having the necessary strength to properly retain the commodity articles in sealed and sanitary segregation. This envelope is formed by surrounding the packaged article with sealing areas in which the material is joined together in an inseparable bond subjected to an oxidization process wherein the physiochemical nature of the cellulose material is altered to become brittle and easily torn, in contradistinction with the normally tough and wiry nature of the cellulose material. Reference is made to my copending divisional application, Serial No. 175,243, filed November 18, 1937, in which is claimed the machine and system for making the package in accordance with the invention.

Referring to the drawings in detail, Figs. 1 and 2 show a portion of the packaging machine according to the invention. A roll of regenerated cellulose material 1 of strip formation is provided upon the spindle 2. The regenerated cellulose material, which is provided with a fusible coating, is initially of a tough and wiry nature and is substantially transparent to light. A leader 3 extends from the roll 1 and is fed over idler rollers 4, 5 and 6, the spindle 2 and the idler rollers 4, 5 and 6 being suitably mounted on a frame. From idler roller 6 the leader strip 3 extends into the article feeding and package forming equipment. The commodity articles 25 are fed into the packaging equipment from a suitable article feeding mechanism 62, such as disclosed in my copending application Serial No. 748,846, filed October 18, 1934, now Patent No. 2,083,617, issued June 15, 1937.

Another leader strip 3b similar to leader strip 3 passes over idler roller 7 and proceeds from equipment which may be similar to the equipment on the right hand side of Fig. 2 for handling leader strip 3. The package forming equipment consists, in part, of a pair of rollers 8 and 10. These rollers are mounted upon shafts extending through suitable bearings in a supporting boss 11. These shafts have a hollow portion co-extensive with the rollers 8 and 10 in which heater cartridges 12 are provided. Suitable terminal units 13 are provided for supplying electrical energy to the heater cartridges 12.

The roller 8 is provided with a peripheral row of recesses 14 while the roller 10 is provided with a peripheral row of recesses 15. In the peripheral surfaces surrounding these recesses the rollers 8 and 10 are provided with crimping surfaces or areas 16. These crimping surfaces are mechanically complementary to each other so that the crimping surface of roller 8 meshes and engages with the crimping surface of the roller 10 to produce a forced interdigitation of the cellulose material fed therebetween effecting a crisscross formation. In rotation of the rollers 8 and 10, the recesses 14 of the roller 8 coincide with the recesses 15 of the roller 10, so that the commodity articles are held therebetween in a proper positioning effect without crushing, while the crimping surfaces join the opposed layers of packaging material in crimped bonding areas surrounding these articles. This forced interdigitation process between the crimped areas is accompanied by a heating process due to the heating cartridges 12 which cause the oxidation of the coated cellulose material within a range higher than that required to produce mere adherence of the material and less than that which would produce crumbling of the material, thereby producing an embrittled structure. The shafts supporting rollers 8 and 10 are provided with gears which engage with one another and cause the complementary rotation of the rollers 8 and 10 in opposed directions. These shafts may be coupled through suitable gearing with an electric motor and also with other equipment in the packaging machine, such as the article feeding mechanism, the color paper and indicia producing rollers, to operate in timed relationship.

The rollers 8 and 10 are provided with a plurality of stripper fingers 23 and 24 which may be secured to a boss on the general mounting structure. These stripper fingers are positioned in annular slots in the rollers so as to occupy positions behind the indicia markings on the rollers. The purpose of these stripper fingers 23 and 24 is to guide the packaging material into and out of the rollers 8 and 10 and particularly to avoid a tendency of the packaging material to wrap around the rollers. These stripping fingers may be provided on all the rollers in this packaging mechanism for this purpose as required.

Indicia rollers 17 and 18 are carried on shafts 21. The surface of the roller 17 is provided with raised indicia marking elements 22 which in the present instance, by way of illustration, correspond to the letter L but numerals or any special insignia may be substituted. Corresponding indicia elements are provided on the roller 17, and the indicia elements of both rollers, although raised with reference to the peripheries of the rollers, are provided with complementary crimping surfaces so that cellulose material fed therebetween is embossed with the desired character. The shafts of these rollers are mounted with suitable gears in a frame. These shafts are hollow and are provided with heater cartridges as well as a commutator arrangement for delivering electrical energy thereto as described later in connection with further rollers.

Above the packaging material leader strip 3 and in line with the roller 18, there is mounted the roller 17 which is substantially similar to the roller 18 with the exception that the indicia markings provided thereon are mechanical complements of the indicia markings of roller 18 as before pointed out. As the leader 3 is fed between these rollers there is produced a forced indicia interdigitation of the strip 3, while at the same time heating the desired portion to produce an oxidization sufficient to change the physiochemical character of the material to alter the index of refraction in the area forming the indicia marking.

Still referring to Fig. 1, there is provided a pair of rollers 26a and 26 which combine several functions in their action and will now be considered in detail. Each of these rollers is provided with a row of peripheral projections 27, and, in the present representation there are four such projections provided on each roller. It will be understood, of course, that the number of recesses and rows of recesses may be varied to meet various packaging requirements. Recesses 28 are centrally disposed in the projections 27. In the areas immediately surrounding the recesses 28 on the rollers 26a and 26, there are provided crosshatched and projecting crimping surfaces. The crimping surfaces of the rollers 26a and 26 are complementary to each other and mesh with one another to produce an interdigitation of the layer of packaging material in circular formation.

The rollers 26a and 26 are secured upon shafts 30 and 31 which are rotatably mounted through bearings in the boss 32, as shown in Fig. 2. Referring to Fig. 2, it will be seen that the shaft 31 is hollow for a portion of its length co-extensive with roller 26. In this hollow portion a heater cartridge 33 is provided which includes a resistance element for heating the roller 26 to a temperature sufficient to cause oxidization and a physiochemical change in the regenerated cellulose packaging material when in contact therewith. At the outer extremity of the shaft 31 an insulating element 34 is provided with collector rings which connect with opposite terminals of the heater cartridge 33. The collector rings on the element 34 are engaged by contact brushes respectively carried by a terminal mounting 35 secured to the boss 32 by mounting element 36. The terminal mounting 35 is provided with suitable leads so that electrical energy may be supplied in the proper amount to the heater element internal of the roller 26. The roller 26a is provided with a similar heating arrangement, as are the other rollers before described.

To effect the complementary rotation of the rollers 26a and 26, the shafts 30 and 31 are provided with gears as shown in dotted line in Fig. 1. These two gears engage each other so as to cause the rotation of the rollers 59 and 60 in timed relationship with respect to other moving parts of the packaging machine and with respect to each other in a manner such that the recesses 28 coincide with each other as the rollers 26a and 26 are rotated in opposite directions. The crimping surfaces of the rollers 26a and 26 then mesh with each other in a complementary fashion to cause a forced interdigitation of the material fed therebetween.

Referring to Fig. 2, in the recesses of the roller 26a there are provided drilled openings 37 connecting with a transverse drilling 38 extending through the hub 40 of roller 26a. A semicircular channel 41, as shown in Fig. 4, is cut into a disk 42 mounted on the boss 32. A pipe 46 connects channel 41 with a suitable vacuum system, such as a pump. As the roller 26 is revolved with respect to the disc 42, in the direction of the arrow in Fig. 4, the openings 38 come successively into engagement with the channel 41, two at a time. Referring back to Fig. 1, a reservoir 47 is provided beneath the roller 26. This reservoir 47 is filled with a stack of colored paper inserts 52. In the present instance, these inserts 52 are round and composed of colored paper, although they may be of different shapes and material. The top of the reservoir 47 is provided with a pair of springs 48 and a lip 50. A resiliently operated plunger 51 operates through the reservoir to urge the stack of inserts 52 in an upward direction against the springs 48. When one of the projections 27 passes over the top of the reservoir 47, a suction action is produced due to engagement with the channel 41, as before pointed out. This suction action causes the top insert to become attached to the proximate projection 27. The rotation of the roller 26 then moves this insert 52 from beneath the springs 48 and over the lip 50. This insert 52 is then carried around to a position diametrically opposed whereupon the insert is forcibly interdigitated with the strip 3 under pressure and heat. As soon as the insert is brought into this interdigitating position, the suction action is automatically cut off due to rotation of the roller 26 with reference to the channel 41. The inserts 52 may also have printing thereon such as instructions for the dosage of the packaged commodity and other forms of indicia to accompany the package.

In Fig. 1 the arrangement for feeding the inserts 52 may be provided in association with the roller 26, as shown in Fig. 1, or may be provided in association with other of the rollers such as roller 26a. When provided as shown in Fig. 1, the inserts 52, which are either printed labels or colored transparent coated cellulose, are attached exteriorly to the strip 3. However, the inserts can be equally well fed by the roller 26a so that they are provided internally of the strip 3 in the construction of package shown in Fig. 7.

Fig. 5 illustrates the appearance of a strip of the material in course of passing through the various operations of the machine shown in Fig. 1. The section "a" represents a portion of the strip before reaching the rollers 17 and 18. The section "b" represents the subsequent portion of the strip after having been acted upon by the rollers 17 and 18, and in which the indicia characters have been marked by the oxidization process in anticipation of the formation of packages in predetermined areas. The section "c" represents a subsequent portion of the strip after having been acted upon by the rollers 26a and 26 and in which the color insert has been sealed to either side of the strip 3. The section "d" represents completed package sections in which the leader strip 3 has been joined with the leader strip 3b by crimping 57 to enclose commodity articles 25 with further oxidization areas surrounding the articles to form embrittled sealing areas, the packaging material thus being subjected to a plural oxidization and fabrication process.

In another form of the invention the rollers 18 and 26 may be combined into a composite form of the roller 16 while the rollers 17 and 26a can be combined into a composite form of the roller 8 so that the rollers 8 and 16 can perform all of the functions of these rollers in one operation.

Fig. 6 represents one of the package units when detached from the strip shown in Fig. 5. It will be seen that the central indicia character 53 is surrounded by an embossed ring 54. The entire surface of the strip 3 within the ring 54 is characterized by the color of the insert 52 thereunder, as may be seen in the sectional view of Fig. 7. However, the ring 54 and the character 53 have both been produced by an oxidization treatment but, since the character 53 was produced independently of the insert 52, it will be a color different from that of the ring 54. Thus, it will be seen how it is possible to produce different color effects by the oxidized process even while using one color of insert. The sectional view of Fig. 7 shows how the various materials are related to each other with respect to the commodity package. It will be noted that the insert 52 is smaller than the commodity 25 and does not obscure a viewing of the same through the transparent wall of the leader strip 3.

In another modification of the invention, continuous strips of colored insert material may be employed. Rollers 58, 59, 60 and 61 are mounted in suitable relation with the strips 3 and 3b for cooperation therewith in a feeding process. For example, continuous insert strips 3d and 3e may be fed in juxtaposition with the strips 3b and 3 by means of rollers 58 and 59. Such strips may be of colored material, may be of the same width as strips 3b or 3, or of a different width. These strips 3d and 3e can be of colored coated cellulose material, paper, foil, or similar materials for producing various optical effects in combination with the transparent regenerated cellulose packaging material. Similarly, strips 3f and 3c can be fed in juxtaposition with leader strip 3 by means of rollers 60 and 61. These strips may also be substantially similar to strips 3d and 3e. The strips fed by rollers 58—61 can be used singly or in combination. For example, the strip 3c can be utilized in combination with the form of package already described. This strip may be of a width substantially less than the width of the strip 3 and would appear as shown in Fig. 8 and by dotted line in Fig. 6. In this form of the invention, the strip 3c is of a contrasting color with respect to the insert 52, and gives a particularly pleasing color effect.

Although I have shown a preferred form of my composite package it will be understood that various modifications can be made without departing from the intended scope of my invention. I do not therefore, desire to limit myself to the foregoing except as may be pointed out in the appended claims.

What I claim as new and desire to secure by Letters Patent of the United States is:

1. A package structure comprising, a commodity-containing envelope composed of two walls of material sealed together in a sealing area, one of said walls being composed of heat sealable packaging material, and an indicia insert interposed between said commodity and said wall of material and heat sealed thereto in an area within the boundary of said first mentioned sealing area, said insert being held by said wall by said heat seal.

2. A package comprising, a sealed commodity-containing envelope composed of walls of transparent heat sealable packaging material sealed together to provide an external sealing flange, and an insert of color material attached to one wall of said envelope by means of a heat seal between said insert and said wall separate from said sealing flange and within the boundary of the same.

3. A package comprising, a commodity-containing envelope having at least one wall thereof composed of transparent packaging material, heat crimped indicia configurations formed in said wall, and a color insert attached to said wall internally of said envelope behind said indicia configuration for imparting a contrasting color effect to said indicia.

LEROY L. SALFISBERG.